United States Patent
Eaton et al.

(10) Patent No.: US 6,713,689 B2
(45) Date of Patent: Mar. 30, 2004

(54) SYSTEM AND METHOD FOR WEIGHING ITEMS SUCH AS MAILPIECES WITH VARYING ACCURACY

(75) Inventors: David J. Eaton, Newtown, CT (US); John E. Massucci, Bronx, NY (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/192,362

(22) Filed: Jul. 9, 2002

(65) Prior Publication Data

US 2004/0007395 A1 Jan. 15, 2004

(51) Int. Cl.[7] .................... G01G 19/40; G01G 23/01
(52) U.S. Cl. .................. 177/25.15; 705/407; 702/101; 177/50; 177/185
(58) Field of Search ............... 177/25.11–25.17, 177/25.19, 50, 185; 705/407, 414, 415; 702/101, 102

(56) References Cited

U.S. PATENT DOCUMENTS

| | | | |
|---|---|---|---|
| 4,351,033 A | 9/1982 | Uchimura et al. | 364/900 |
| 4,516,209 A | 5/1985 | Scribner | 364/466 |
| 4,742,878 A | 5/1988 | Freeman et al. | 177/25 |
| 4,787,048 A | 11/1988 | Freeman et al. | 364/466 |
| 5,119,306 A | 6/1992 | Metelits et al. | 364/464 |
| 5,172,783 A | 12/1992 | Feinland et al. | 177/185 |
| 5,178,228 A | 1/1993 | Feinland et al. | 177/185 |
| 5,190,115 A | * 3/1993 | Dolan et al. | 177/25.15 |
| 5,226,496 A | 7/1993 | Feinland et al. | 177/25.15 |
| 5,717,166 A | 2/1998 | Talmadge | 177/25.13 |
| 5,723,825 A | 3/1998 | Dolan et al. | 177/145 |

FOREIGN PATENT DOCUMENTS

EP        534738 A2 * 3/1993 ............... 177/25.15

* cited by examiner

*Primary Examiner*—Randy W. Gibson
(74) *Attorney, Agent, or Firm*—Brian A. Lemm; Angelo N. Chaclas

(57) ABSTRACT

A method and method for fast weighing of items such as mailpieces with variable accuracy. The method includes a scale method having a platform connected to a load cell that provides an output signal to an analog-to-digital converter. The resulting digital output signal is processed by a low pass filter and analyzed by a microprocessor to determine weights of items on the platform. The microprocessor also determines postage amounts of items on the platform. The microprocessor also determines postage amounts as functions of the weights and outputs these postage amounts to a postage meter. The microprocessor determines the weights as the average of a sequence of digital output signal values if the average id not closer than D to any weight break, where D is the difference between a maximum output value and a minimum output value.

28 Claims, 3 Drawing Sheets

SYSTEM AND METHOD FOR WEIGHING ITEMS SUCH AS MAILPIECES WITH VARYING ACCURACY

BACKGROUND OF THE INVENTION

The present invention relates to a system and method for rapid weighing and metering of items. More particularly it relates to postage metering systems used to weigh, determine postage for, and meter (i.e. imprint with a postal indicium representative of the postage determined) mail pieces or the like.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mail piece in order that the throughput of the system can be increased. U.S. Pat. No. 4,787,048; issued: Nov. 22, 1988, discloses one approach to decreasing the time required for a postage scale system to determine the weight of a mail piece. The system disclosed in this patent takes advantage of the structure of postage rate charts, i.e., the function that relates the weight of the mail piece to the appropriate postage amount. Such rate chart provides a constant postage value for all weights in a weight range between a pair of predetermined weight breaks. The system of the '048 patent takes advantage of this by use of an method where a first estimate of the weight is made and used to determine the postage amount unless the first estimate is within a predetermined distance of a break point, in which case a second more accurate estimate is made.

A basic cause of the delay in determining weight for a mail piece is the tendency for a scale system to oscillate in response to the arrival of the mailpiece on the system. These oscillations are damped, but only slowly arrive at a new stable output value representative of the weight of the mail piece. Heretofore systems have relied on an averaging process over a number of samples taken over a number of cycles of the oscillations to approximate the weight output. While systems using such averaging type methods have generally proved satisfactory in the past, further decreases in the time required to determine a weight are still sought. Thus it is the object of the present invention to provide a scale system, and a postage metering system incorporating such scale system, which can more rapidly determine the weight of a mailpiece or the like.

BRIEF SUMMARY OF THE INVENTION

The above object is achieved and the disadvantages of the prior art are overcome in accordance with the present invention by means of a system for determining a weight for an item, including: a scale system for generating a digital output signal, and a data processing system. The scale system includes: a support for supporting said item; and a transducer for generating said digital output signal, said signal being representative of an instantaneous response of said support. In response to said digital output signal the data processing system: detects the presence of said item on said support; then stores a sequence of values of said digital output signal, said sequence initially consisting of a first predetermined number of initial values of said digital output signal; determines a difference, D, between a maximum value in said sequence and a minimum value in said sequence; determines an average, A, of a second predetermined number of latest values in said sequence; determines if an absolute value of (B−A) is less than D, where B is a weight break between weight ranges; and, if so updates said sequence by replacing a third predetermined number of earliest values in said sequence with said third predetermined number of new latest values of said digital output signal; and returning to redetermine D and continue; and, if not calls said weight as said average A.

In accordance with one aspect of the present invention the first predetermined number is selected so that said initial values cover a time period of approximately 60 milliseconds.

In accordance with another aspect of the present invention the second predetermined number is selected so that said latest values cover a time period of approximately 40 milliseconds.

In accordance with another aspect of the present invention the third predetermined number is selected so that said earliest values and said new latest values cover time periods of approximately 2 milliseconds.

In accordance with another aspect of the present invention the digital output signal has a sampling interval less than or equal to approximately 2 milliseconds.

In accordance with another aspect of the present invention 0 weight is not a weight break; so that, for a first weight range, potential errors greater than ½ said first weight range can be accepted.

Other objects and advantages of the present invention will be apparent to those skilled in the art from consideration of the detailed description set forth below and the attached drawings.

DETAILED DESCRIPTION OF PREFERRED EMBODIMENTS OF THE INVENTION

Figure 1:
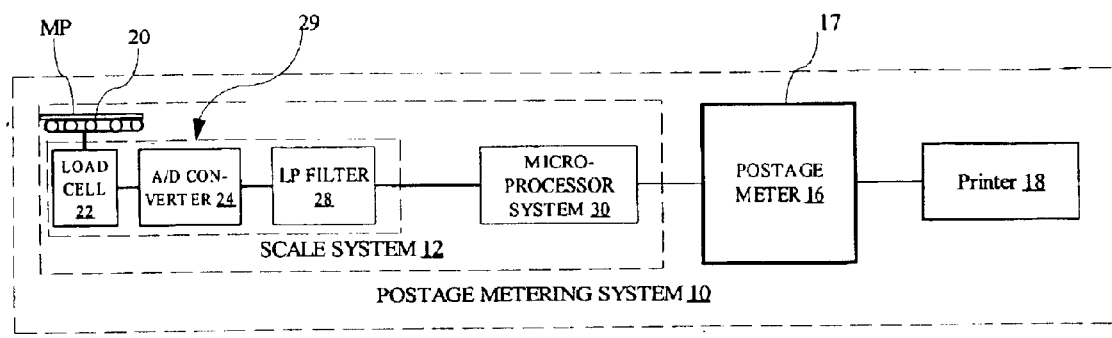
FIG. 1 is a schematic block diagram of a postage metering system including a scale system in accordance with the present invention.

In FIG. 1 postage metering system 10 includes scale system 12 and postage meter 16. Postage meter 16 includes vault 17 (i.e. secure accounting registers) and is programmed to quickly account for mailpieces requiring only minimum postage. Scale system 12 includes load cell 20, producing a response to the force from platform 22; analog-to digital converter 24, for converting the output of load cell 20 to a sequence of digital values; low pass filter 28; and microprocessor 34, for processing filtered digital output signal . . . s(i), s(i+1), s(i+2) . . . to determine a weight and provide an output representative of the postage corresponding to that weight to postage meter 16. In accordance with the present invention microprocessor 30 is programmed with a novel method for rapid estimation of a weight for mailpieces. (While filter 28 is shown as a separate element in FIG. 1 for simplicity of illustration, it should be noted that filter 28 can be, and preferably is, implemented by software running in microprocessor 30.)

In the embodiment shown in FIG. 1 load cell 20, converter 24, and filter 28 form a transducer for generating a digital output signal . . . s(i), s(i+1), s(i+2) . . . representative of the response of scale system 12. Other embodiments, where other types of transducers generate the representative signal, are also within the contemplation of the present invention.

Figure 2:
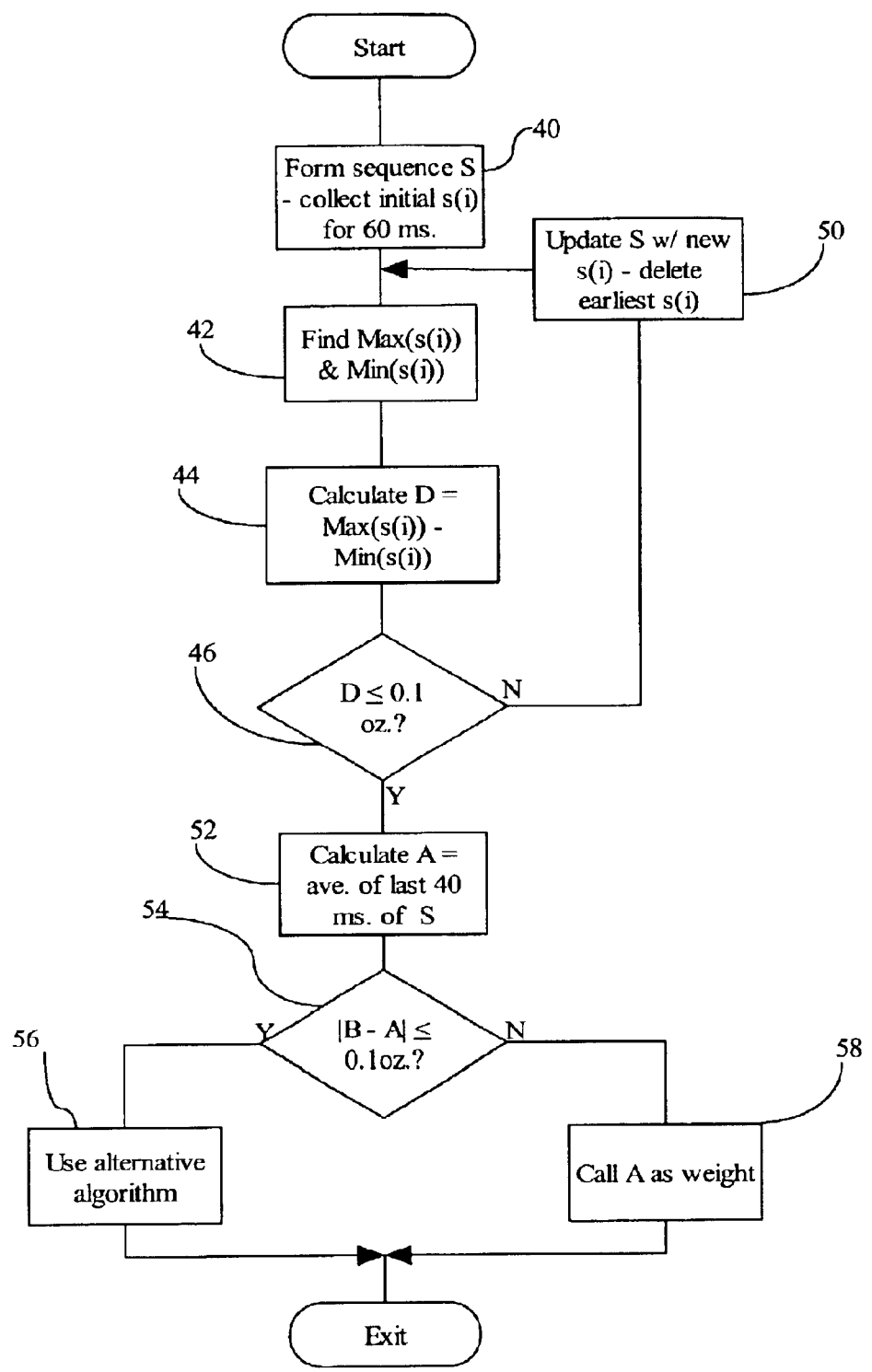
FIG. 2 shows a flow diagram of a prior art method for determining weight.

FIG. 2 shows a flow diagram of a previously used weighing method. When microprocessor 30 detects the presence of mail piece MP on platform 22, which can be done in any convenient manner, it initializes the method at step 40 by storing a sequence S of initial values of s(i), which cover the initial time period after mail piece MP is transported onto platform 22. Typically this time period is approximately 60 ms (milliseconds). At a sampling interval of approximately 2 ms sequence S will include approximately 30 values s(i). Shorter sampling intervals can be used but may require a more powerful microprocessor.

Then at steps 42 and 44 microprocessor 30 finds the maximum value Max(s(i)) and minimum value Min(s(i)) in sequence S and calculates D=Max(s(i))−Min(s(i)). Then at step 46 microprocessor 30 determines if D≦0.1 oz. If not, at step 50 mp 30 updates sequence S by discarding values s(i) covering the earliest 2 ms of sequence S and adds new values s(i) covering the latest 2 ms. At a 2 ms sampling interval this is one value s(i). Microprocessor 30 then returns to step 42.

When vibrations are reduced so that D≦0.1 oz. at step 46 microprocessor 30 goes to step 52 and calculates A, the average of values s(i) covering the last approximately 40 ms of sequence S; approximately 20 values s(i) at the preferred 2 ms sampling interval. Then at step 54 microprocessor 30 determines if |B−A|≦0.1 oz., where B is any weight break; i.e. if A is within 0.1 oz. of a weight break. If so, the microprocessor 30 uses an alternative method (which need not be discussed further here for an understanding of the present invention) to determine a weight for mail piece MP, and if not calls, and preferably validates, average A as the weight. (Calling a weight, as used herein, means microprocessor 30 uses the current weight value to determine the postage for a mailpiece. Validating a weight, as used herein, means that microprocessor 30 calculates the net weight and insures that it is above 0 and within maximum scale limits.)

While the above described method has proven highly successful it is believed to suffer from a disadvantage in requiring that the vibrations substantially die out (i.e. $_jD≦0.1$ oz.) before any attempt is made to call a weight. The novel, time saving method of the present invention shown in FIG. 3 overcomes this problem by discerning when the weight accuracy is sufficient to call a weight and avoid the time and costs of unnecessarily high accuracy.

Figure 3:
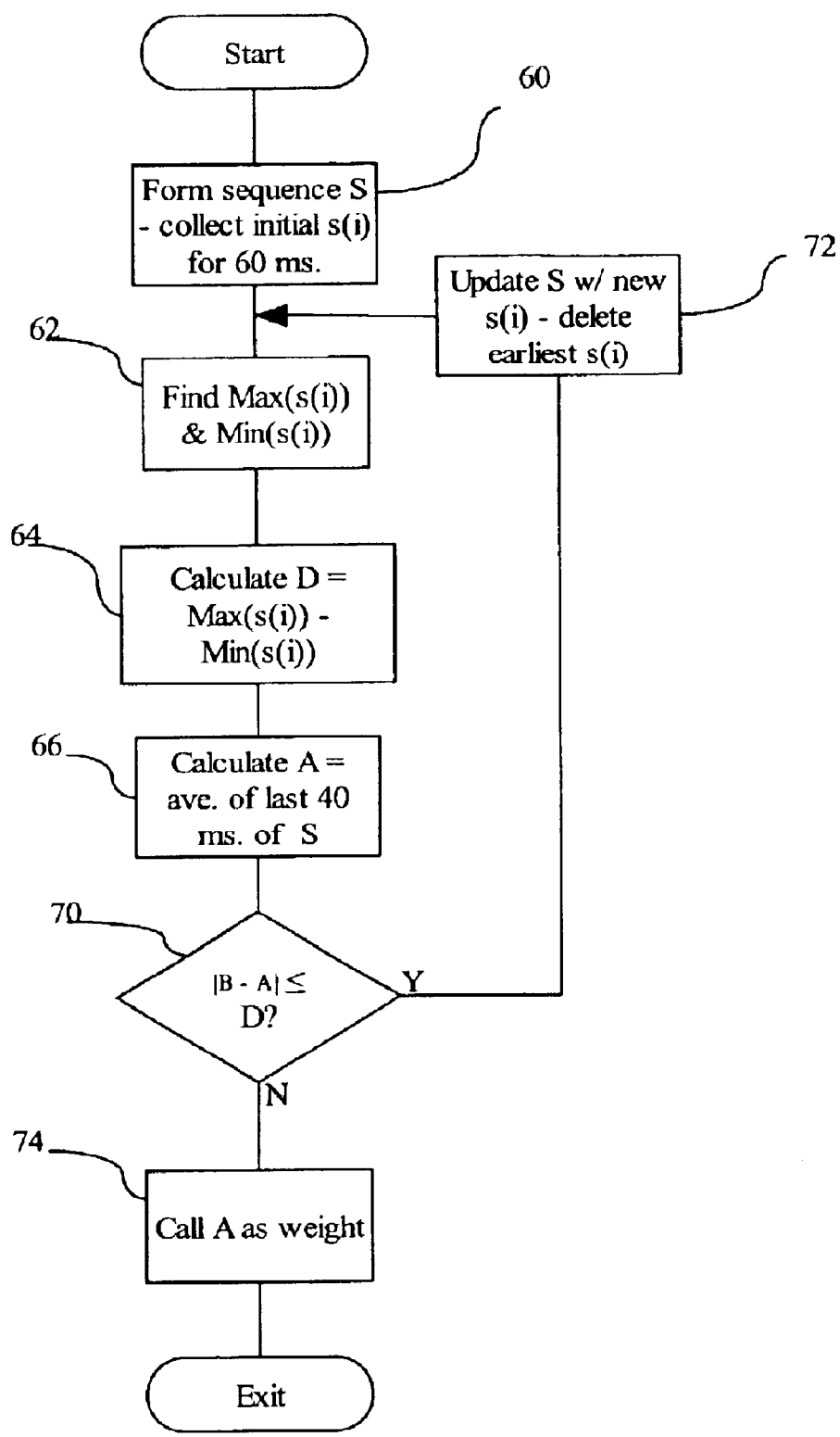
FIG. 3 shows a flow diagram of a method for determining weight in accordance with the present invention.

In FIG. 3, when microprocessor 30 detects the presence of mail piece MP on platform 22, which again can be done in any convenient manner, it initializes the method at step 70 by storing a sequence S of initial values of s(i), which cover the initial time period after mail piece MP is transported onto platform 22. Preferably this time period is approximately 60 ms (milliseconds). At the preferred sampling interval of approximately 2 ms sequence S will include approximately 30 values s(i). Shorter sampling intervals can be used but may require a more powerful microprocessor.

Then at steps 62 and 64 microprocessor 30 finds the maximum value Max(s(i)) and minimum value Min(s(i)) in sequence S and calculates D=Max(s(i))−Min(s(i)). Then at step 66 microprocessor 30 calculates A, the average of values s(i) covering the last approximately 40 ms of sequence S; approximately 20 values s(i) at the preferred 2 ms sampling interval. Then at step 70 microprocessor 30 determines if |B−A|≦D., where B is any weight break; i.e. if A is within D of a weight break B. If so, the microprocessor 30 goes to step 72 to update sequence S by discarding values s(i) covering the earliest 2 ms of sequence S and add new values s(i) covering the latest 2 ms. At the preferred sampling interval this is one value s(i). Microprocessor 30 then returns to step 62. If not, microprocessor 30 calls, and preferably validates, average A as the weight.

It should be noted that the method of the present invention does not require that the vibrations in the digital output signal die out to any particular extent before an attempt is made to call a weight, only that A be more than D ounces from the nearest break weight. Thus potential errors up to ½ of a weight range (e.g. 0.5 ounces) can be accepted and still allow a weight to be called. Further since 0 is preferably not considered a weight break mail pieces in the first weight range, which are typically a majority, can have even larger potential errors and still allow a weight to be called.

The embodiments described above and illustrated in the attached drawings have been given by way of example and illustration only. From the teachings of the present application those skilled in the art will readily recognize numerous other embodiments in accordance with the present invention.

What is claimed is:

1. A system for determining a weight for an item, comprising:
   a) a scale system for generating a digital output signal, said scale system comprising:
      a1) a support for supporting said item; and
      a2) a transducer for generating said digital output signal, said signal being representative of an instantaneous response of said support; and
   b) a data processing system for, in response to said digital output signal:
      b1) detecting presence of said item on said support;
      b2) storing a sequence of values of said digital output signal, said sequence initially consisting of a first predetermined number of initial values of said digital output signal;
      b3) determining a difference, D, between a maximum value in said sequence and a minimum value in said sequence;
      b4) determining an average, A, of a second predetermined number of latest values in said sequence;
      b5) determining if an absolute value of (B−A) is less than D, where B is a weight break between weight ranges;
      b6) if the absolute value of (B−A) is less than D, updating said sequence by replacing a third predetermined number of earliest values in said sequence with said third predetermined number of new latest values of said digital output signal; and returning to step b3; and
      b7) if the absolute value of (B−A) is not less than D, calling said weight as said average A.

2. A system as described in claim 1 where said first predetermined number is selected so that said initial values cover a time period of approximately 60 milliseconds.

3. A system as described in claim 2 where said digital output signal has a sampling interval less than or equal to approximately 2 milliseconds.

4. A system as described in claim 2 where said second predetermined number is selected so that said latest values cover a time period of approximately 40 milliseconds.

5. A system as described in claim 4 where said digital output signal has a sampling interval less than or equal to approximately 2 milliseconds.

6. A system as described in claim 4 where said third predetermined number is selected so that said earliest values and said new latest values cover time periods of approximately 2 milliseconds.

7. A system as described in claim 6 where said digital output signal has a sampling interval less than or equal to approximately 2 milliseconds.

8. A system as described in claim 1 where said second predetermined number is selected so that said latest values cover a time period of approximately 40 milliseconds.

9. A system as described in claim 8 where said digital output signal has a sampling interval less than or equal to approximately 2 milliseconds.

10. A system as described in claim 8 where said third predetermined number is selected so that said earliest values and said new latest values cover time periods of approximately 2 milliseconds.

11. A system as described in claim 10 where said digital output signal has a sampling interval less than or equal to approximately 2 milliseconds.

12. A system as described in claim 1 where zero weight is not a weight break; whereby, for a first weight range, potential errors greater than one-half of said first weight range can be accepted.

13. A system as described in claim 1 where said item is a mail piece.

14. A method for processing a digital output signal, generated by a scale system, to determine a weight for an item on said scale system, said method comprising the steps of:
   a) detecting presence of said item on a support of said scale system;
   b) storing a sequence of values of said digital output signal, said sequence initially consisting of a first predetermined number of initial values of said digital output signal;
   c) determining a difference, D, between a maximum value in said sequence and a minimum value in said sequence;
   d) determining an average, A, of a second predetermined number of latest values in said sequence;
   e) determining if an absolute value of (B−A) is less than D, where B is a weight break between weight ranges;
   f) if the absolute value of (B−A) is less than D, updating said sequence by replacing a third predetermined number of earliest values in said sequence with said third predetermined number of new latest values of said digital output signal, and returning to step c; and
   g) if the absolute value of (B−A) is not less than D, calling said weight as said average A.

15. A method as described in claim 14 where said first predetermined number is selected so that said initial values cover a time period of approximately 60 milliseconds.

16. A method as described in claim 15 where said digital output signal has a sampling interval less than or equal to approximately 2 milliseconds.

17. A method as described in claim 15 where said second predetermined number is selected so that said latest values cover a time period of approximately 40 milliseconds.

18. A method as described in claim 17 where said digital output signal has a sampling interval less than or equal to approximately 2 milliseconds.

19. A method as described in claim 17 where said third predetermined number is selected so that said earliest values and said new latest values cover time periods of approximately 2 milliseconds.

20. A method as described in claim 19 where said digital output signal has a sampling interval less than or equal to approximately 2 milliseconds.

21. A method as described in claim 14 where said second predetermined number is selected so that said latest values cover a time period of approximately 40 milliseconds.

22. A method as described in claim 21 where said digital output signal has a sampling interval less than or equal to approximately 2 milliseconds.

23. A method as described in claim 21 where said third predetermined number is selected so that said earliest values and said new latest values cover time periods of approximately 2 milliseconds.

24. A method as described in claim 23 where said digital output signal has a sampling interval less than or equal to approximately 2 milliseconds.

25. A method as described in claim 14 where zero weight is not a weight break; whereby, for a first weight range, potential errors greater than one-half of said first weight range can be accepted.

26. A method as described in claim 14 where said item is a mail piece.

27. A system as described in claim 1, wherein steps b5 through b7 further comprise:
   b5) determining if an absolute value of (B−A) is less than or equal to D, wherein B is a weight break between weight ranges;
   b6) if the absolute value of (B−A) is less than or equal to D, updating said sequence by replacing a third predetermined number of earliest values in said sequence with said third predetermined number of new latest values of said digital output signal and returning to step b3; and
   b7) if the absolute value of (B−A) is not less than or equal to D, calling said weight as said average A.

28. A method as described in claim 14, wherein steps e through g further comprise:
   e) determining if an absolute value of (B−A) is less than or equal to D, wherein B is a weight break between weight ranges;
   f) if the absolute value of (B−A) is less than or equal to D, updating said sequence by replacing a third predetermined number of earliest values in said sequence with said third predetermined number of new latest values of said digital output signal and returning to step c; and
   g) if the absolute value of (B−A) is not less than or equal to D, calling said weight as said average A.

* * * * *